June 19, 1934.  H. E. JOHNSON  1,963,704
SEALING MEANS
Filed May 28, 1932
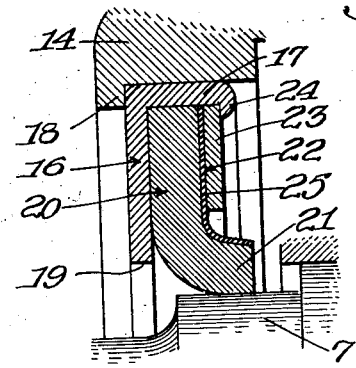
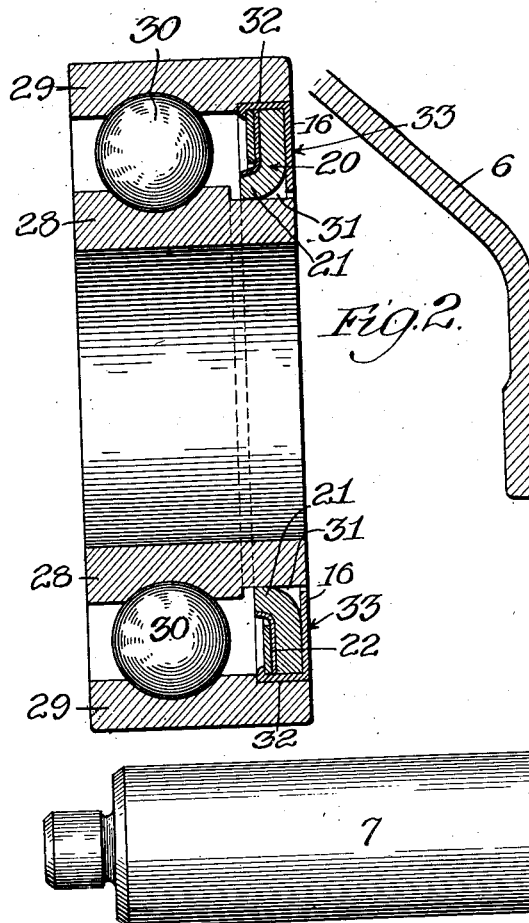
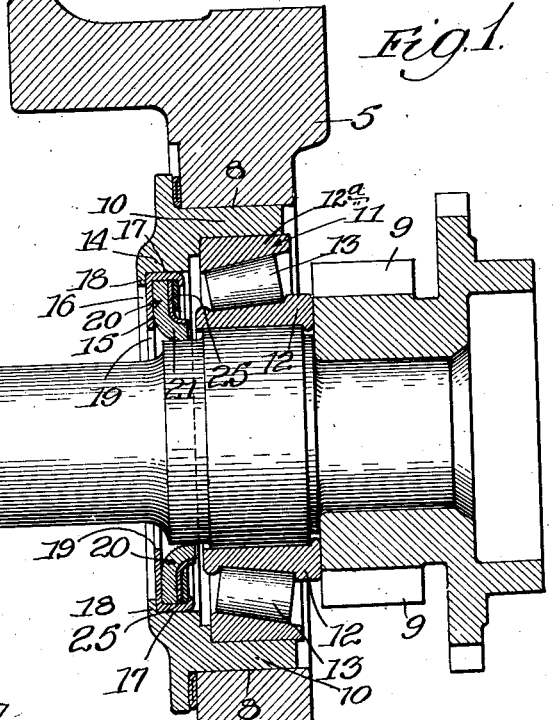
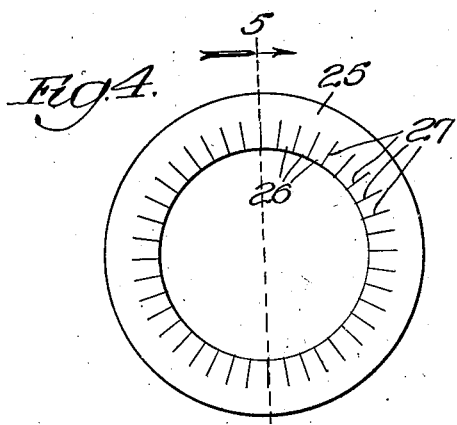
Inventor:
Harold E. Johnson,
By Dyrenforth, Lee, Chritton & Wiles,
Attys.

Patented June 19, 1934

1,963,704

UNITED STATES PATENT OFFICE 1,963,704

SEALING MEANS

Harold E. Johnson, Evanston, Ill., assignor to Chicago Rawhide Manufacturing Company, Chicago, Ill., a corporation of Illinois Application May 28, 1932, Serial No. 614,186

1 Claim. (Cl. 288—1)

My invention relates to oil or grease seals or retainers for use in connection with elements at which seals are to be effected, as for example and more particularly, rotatable members such as rotatable shafts, and the rotatable elements of ball bearings, to prevent the lubricating oil or grease from escaping along such members and also to prevent the ingress of dirt, dust and other foreign matter to the parts which it is desired be sealed, and which would damage these parts or prevent their proper performance.

One of my objects is to provide a construction of sealing means of the type comprising a flanged packing member at which the seal is effected, maintained in sealing position by a series of spring tongues bearing against its flange, which may be made sufficiently thin to permit of its use in constructions wherein the space available for sealing means is relatively narrow, such as for example in the case of automobile transmission mechanisms and in ball bearing assemblies.

Another object relates to the ring structure provided with the spring tongues of sealing means of the general type above referred to, these spring tongues being formed integrally with the body of the ring, and particularly to ring structures the tongues of which are provided at the inner peripheries of the rings, it being my object in this connection to provide a spring-tongue-equipped ring the tongues of which will operate with the maximum efficiency; and other objects as will be manifest from the following description.

Figure 1 is a broken view in sectional elevation of an automobile transmission assembly in which my improved sealing means are incorporated.

Figure 2 is a longitudinal sectional view of a ball-bearing assembly provided with sealing means in accordance with my invention.

Figure 3 is a broken enlarged view of the sealing-equipped part of the transmission mechanism of Fig. 1; and Figure 4, a face view of the spring-tongue-equipped ring forming a part of the sealing means of the preceding figures.

Referring to Figs. 1 and 3 of the drawing, 5 represents the case of a transmission mechanism, as for example of an automobile, from which the clutch-housing wall 6 extends, and 7 the clutch-shaft located in an opening 8 in the case 5 and shown as connected with the transmission gear 9. Positioned in the opening 8 is a flanged ring 10 between which and the shaft 7 a roller-bearing assembly 11 is interposed, this assembly comprising an inner race 12 secured to the shaft 7, an outer race 12a secured in the ring 10 and a circular series of rollers 13 interposed between these races.

The structure described is common practice and the need for conservation of space in structures of this kind is such that the only available location for sealing means for the shaft 7, to isolate the space within the transmission case from the space within the clutch housing, is between the relatively narrow inner annular flange portion 14 of the ring 10 and the shaft 7.

In order that efficient sealing means represented generally at 15 may be provided at the location referred to, I provide the construction of sealing means illustrated and comprising a cup-shaped member 16 which fits tightly, at its annular side wall 17, within the flange 14, abutting a bead 18 at the outer edge of this flange, the member 16 containing a central opening 19 through which the shaft 7 extends.

Located in the cup member 16 is an annular ringlike packing member 20 of rawhide, leather, or other suitable material, which flatwise bears at its outer marginal portion against the inner face of the bottom of the cup 16, its inner annular marginal edge portion being deflected, as represented at 21 at which portion the member 16 snugly embraces the shaft 7.

The packing member 20 is confined in the cup 16 and held constantly in close, sealing, engagement at its portion 21, with the shaft 7, by a spring member 22 and a washer 23, the parts 21, 22 and 23 being clamped together tightly, in flatwise-opposed relation as shown, between the bottom of the cup 16 and the inwardly-turned edge portion 24 at the outer end of the side-wall portion of the cup.

The spring member 22, formed of spring sheet metal, comprises a ring portion 25 from the inner edge of which a circular series of spring tongues 26, integral with the ring portion 25, radiate, the spring member 22 fitting flatwise at its ring portion 25 against the opposing face of the ring portion 25 of the packing member 20 as shown and conformingly fitting at its tongues 26, in the flexed condition shown in Figs. 1 and 3, against the outer surface of the flange portion 21 of the packing member 20, these tongues thus surrounding the flange-portion 21 and under their spring tension urging the flange portion 21 in close embracing and sealing engagement with the shaft 7.

The spring member 22 in normal condition is flat as shown in Fig. 4 and in the assembling of the parts of the seal the tongues 26 are deflected in the pressing of the member 22 into assembled condition with the packing member 20 in which condition the tongues 26 conformably fit, under tension, the surface of the packing member 16 which they oppose.

As shown, and in accordance with one feature of my invention, the tongues of the member 22 are formed by slitting the metal of the inner peripheral member at intervals in a substantially radial direction as indicated at 27, as distinguished from slotting the metal to form the tongues, whereby the spaces presented between adjacent tongues when outwardly deflected as shown in Figs. 1 and 3 are so narrow that the tongues function substantially as a contractible ring surrounding the flange portion 21.

As will be noted from the foregoing, the sealing means described and which constitute a self-contained unit, form a structure which is relatively thin adapting it to be used at locations where a thicker unit could not be used.

In Fig. 2 I have illustrated the embodiment of my invention in a ball-bearing assembly where the space available for sealing means is very narrow.

In this construction 28 represents the inner race of the ball bearing, 29 the outer race thereof and 30 the annular series of balls confined between the races 28 and 29, the whole constituting a self-contained unit.

The races 28 and 29 to one side of the balls 30 are internally annularly grooved as represented at 31 and 32, respectively, to receive the sealing means represented at 33 and of the same construction as that shown in the other figures of the drawing, the cup member 16 being tightly fitted in the groove 32 and the deflected portion 21 of the packing member surrounding the race 28 and pressing thereagainst to produce a seal under the action of the spring-tongue-equipped member 22 as explained in connection with the use of the seal in Figs. 1 and 3.

While I have illustrated and described certain particular embodiments of my invention, I do not wish to be understood as intending to limit it thereto as the same may be variously modified and altered and the invention embodied in other forms of structure without departing from the spirit of my invention.

What I claim as new, and desire to secure by Letters Patent, is:

A bearing seal comprising, in combination: a cup member comprising an annular ring and a flange integral with its outer periphery; an annular ring of flexible material of greater width than that of the first named ring and in flatwise engagement with the inner surface thereof; a thin resilient disk-like ring substantially co-extensive with said flexible ring having its inner edge slitted radially to provide spring fingers; said last named ring in contact with the inner face of said flexible ring substantially throughout its extent; an annular washer ring of less radial extent than the first named rings and in flat-wise engagement throughout one surface with said resilient ring; and the free edge of said flange inturned about the edge of said washer ring to hold the parts in assembly whereby the axial dimension of the assembly is limited to the combined thickness of said rings and said inturned edge.

HAROLD E. JOHNSON.